United States Patent [19]

Allen

[11] Patent Number: 5,196,509
[45] Date of Patent: Mar. 23, 1993

[54] SIDE CHAIN CONDENSATION POLYMER WHICH EXHIBITS NONLINEAR OPTICAL RESPONSE

[75] Inventor: Diane E. Allen, Springfield, N.J.

[73] Assignee: Hoechst Celanese Corp., Somerville, N.J.

[21] Appl. No.: 675,342

[22] Filed: Mar. 25, 1991

[51] Int. Cl.⁵ .............................................. C08G 69/00
[52] U.S. Cl. .................................... 528/331; 528/183; 528/184; 528/185; 528/188; 528/321; 528/327; 528/330; 528/331; 528/337; 528/341; 528/345; 528/347; 528/351; 528/353
[58] Field of Search ............... 528/331, 327, 321, 337, 528/330, 341, 347, 345, 352, 353, 183, 184, 185, 188

[56] References Cited

U.S. PATENT DOCUMENTS 3,454,535  7/1969  Bodesheim et al. ................ 528/337
4,579,915  4/1986  Choe .................................... 528/331

Primary Examiner—Harold D. Anderson
Attorney, Agent, or Firm—Michael W. Ferrell

[57] ABSTRACT

In one embodiment this invention provides polymalonamide polymers with side chains which exhibit nonlinear optical response.

Illustrative of an invention polymalonamide is a polymer which has the following recurring monomeric structure:

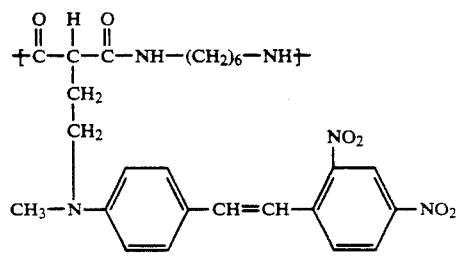

8 Claims, No Drawings

SIDE CHAIN CONDENSATION POLYMER WHICH EXHIBITS NONLINEAR OPTICAL RESPONSE

BACKGROUND OF THE INVENTION

Thin films of organic or polymeric materials with large second order optical nonlinearities in combination with silicon-based electronic circuitry have potential as systems for laser modulation and deflection, information control in optical circuitry, and the like.

Other novel processes occurring through third order nonlinearity such as degenerate four-wave mixing, whereby real-time processing of optical fields occurs, have potential utility in such diverse fields as optical communications and integrated circuit fabrication.

Of particular importance for conjugated organic systems is the fact that the origin of the nonlinear effects is the polarization of the $\pi$-electron cloud as opposed to displacement or rearrangement of nuclear coordinates found in inorganic materials.

Nonlinear optical properties of organic and polymeric materials was the subject of a symposium sponsored by the ACS division of Polymer Chemistry at the 18th meeting of the American Chemical Society, September 1982. Papers presented at the meeting are published in ACS Symposium Series 233, American Chemical Society, Washington, D.C. 1983.

Of more specific interest with respect to the present invention embodiments is prior art relating to polymers with comb-like side chains. Eur. Polym. J., 18, 651 (1982) describes liquid crystalline polyvinyl polymers of the smectic and nematic types with cyanobiphenyl groups in the side chains.

The preparation of polyvinyl side chain polymers by free radical polymerization often is inhibited by the presence of structural substituents such as nitro groups. Polycondensation reactions are not inhibited in the manner of free radical reactions. SPIE-Int. Soc. Opt. Eng., 682 (Mol. Polym. Optoelectron. Mater: Funkam. Appl.) 65-69 (1987) by Griffin et al describes the production of side chain polyesters by a polycondensation reaction utilizing a titanium tetraisopropoxide catalyst. U.S. Pat. No. 2,631,992 describes the synthesis of linear polyamides from disubstituted malonic acid.

There is continuing interest in the theory and practice of polymers which are characterized by comb-like side chain structures which can be oriented in an applied external field.

There is also an increasing research effort to develop new nonlinear optical organic systems and devices adapted for laser frequency conversion, information control in optical circuitry, light valves and optical switches. The potential utility of organic materials with large second order and third order nonlinearities for very high frequency application contrasts with bandwidth limitations of conventional inorganic electrooptic materials.

Accordingly, it is an object of this invention to provide novel polymers with comb-like side chains.

It is another object of this invention to provide condensation polymers having side chains which exhibit nonlinear optical response.

It is another object of this invention to provide side chain polymalonamide polymers which exhibit nonlinear optical response, and which have superior film-forming properties.

It is a further object of this invention to provide optical light switch and light modulator devices with a transparent polymeric nonlinear optical component comprising a side chain polymalonamides.

Other objects and advantages of the present invention shall become apparent from the accompanying description and examples.

DESCRIPTION OF THE INVENTION

One or more objects of the present invention are accomplished by the provision of a polymer which is characterized by recurring monomeric units corresponding to the formula:

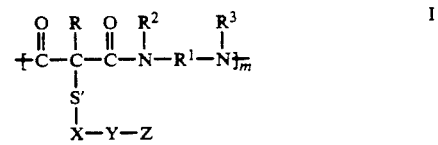

where m is an integer of at least 10; R is hydrogen or a $C_1$-$C_4$ alkyl substituent; $R^1$ is a divalent organic radical containing between about 2-12 carbon atoms; $R^2$ and $R^3$ individually are hydrogen or a $C_1$-$C_4$ alkyl substituent, or taken together with the connecting nitrogen atoms form an alicyclic structure; S' is a spacer group having a linear chain length of about 1-10 atoms; X is an electron-donating group; Y is a 4,4'-diphenylene or 4,4'-stilbene structure; and Z is an electron-withdrawing group.

In another embodiment this invention provides a polymer which is characterized by recurring monomeric units corresponding to the formula:

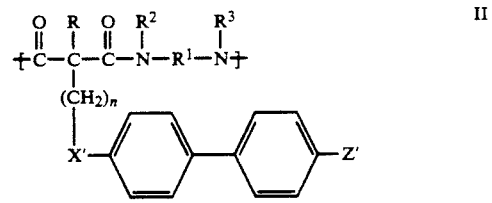

where n is an integer between about 1-10; R is hydrogen or a $C_1$-$C_4$ alkyl substituent; $R^1$ is a divalent organic radical containing between about 2-12 carbon atoms; $R^2$ and $R^3$ individually are hydrogen or a $C_1$-$C_4$ alkyl substituent, or taken together with the connecting nitrogen atoms form an alicyclic structure; X' is —NR—, —O— or —S—; and Z' is —CN, —NO$_2$, —CF$_3$, —CH=C(CN)$_2$ or —C(CN)=C(CN)$_2$; and where the polymer has a glass transition temperature between about 40°-150° C.

In another embodiment this invention provides a polymer which is characterized by recurring monomeric units corresponding to the formula:

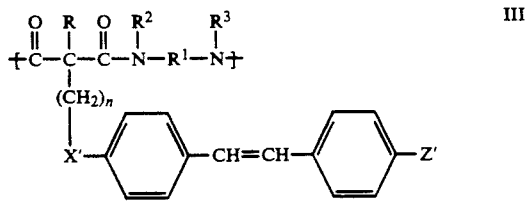

where n, R, $R^1$, $R^2$, $R^3$, X' and Z' are as previously defined for formula II, and the polymer has a glass transition temperature between about 40°-150° C.

A present invention polymer typically has a weight average molecular weight in the range between about 10,000–500,000.

Illustrative of $C_1$-$C_4$ alkyl groups are methyl, ethyl, propyl, isopropyl, butyl, isobutyl and 2-butyl.

Illustrative of $R^1$ divalent organic radicals are —$(CH_2)_{2-4}$—O—$(CH_2)_{2-4}$—and —$(CH_2)_{2-10}$— structures.

The term "electron-donating" as employed herein refers to organic substituents which contribute electron density to the $\pi$-electron system when the conjugated electronic structure is polarized by the input of electromagnetic energy.

The term "electron-withdrawing" as employed herein refers to electronegative organic substituents which attract electron density from the $\pi$-electron system when the conjugated electron structure is polarized by the input of electromagnetic energy.

In another embodiment this invention provides a nonlinear optical medium consisting of a transparent film of a polymer which is characterized by recurring monomeric units corresponding to the formula:

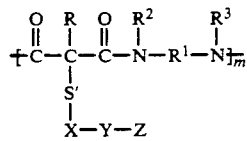

where m, R, $R^1$, $R^2$, $R^3$, S', X, Y and Z are as previously defined for formula I.

In another embodiment this invention provides a nonlinear optical medium consisting of a transparent film of a polymer which is characterized by recurring monomeric units corresponding to the formula:

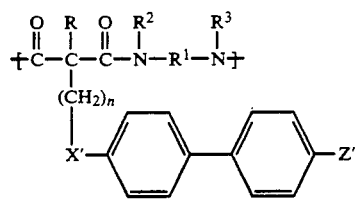

where n, R, $R^1$, $R^2$, $R^3$, X', and Z' are as previously defined for formula II, and the polymer has a lass transition temperature between about 40°-150° C.

In another embodiment this invention provides a nonlinear optical medium consisting of a transparent film of a polymer which is characterized by recurring monomeric units corresponding to the formula:

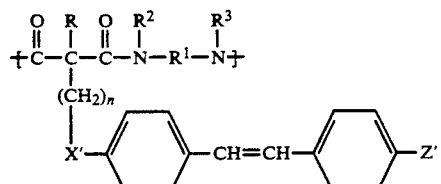

where n, R, $R^1$, $R^2$, $R^3$, X' and Z' are as previously defined for formula III, and the polymer has a glass transition temperature between about 40°-150° C.

A present invention nonlinear optical medium is centrosymmetric in bulk configuration when fabricated. This form of optical medium exhibits third order nonlinear optical susceptibility $\chi^{(3)}$.

A present invention nonlinear optical medium is amenable to an external field-induced orientation of aligned polymer side chains, and in a molecularly oriented state the medium exhibits second order nonlinear optical susceptibility $\chi^{(2)}$.

In another embodiment this invention provides an optical light switch or light modulator device with a polymeric nonlinear optical component comprising a transparent solid medium of a polymer which is characterized by recurring monomeric units corresponding to those in formula I, II or III as represented above.

In another embodiment this invention provides a malonate corresponding to the formula:

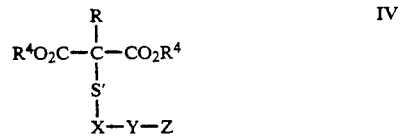

where R is hydrogen or a $C_1$-$C_4$ alkyl substituent; $R^4$ is hydrogen or an organic substituent containing between about 1-12 carbon atoms; S' is a spacer group having a linear chain length of about 1-10 atoms; X is an electron-donating group; Y is a 4,4'-diphenylene or 4,4'-stilbene structure; and Z is an electon-withdrawing group.

In another embodiment this invention provides a malonate corresponding to the formula:

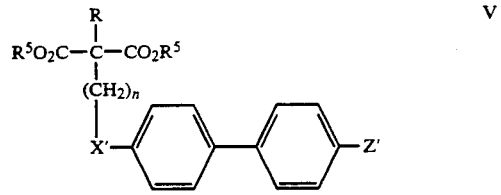

where R is hydrogen or a $C_1$-$C_4$ alkyl substituent; $R^5$ is hydrogen or a $C_1$-$C_{12}$ alkyl substituent; n is an integer between about 1-10; X' is —NR—, —O— or —S—; and Z' is —CN, —NO$_2$, —CF$_3$, —CH=C(CN)$_2$ or —C(CN)=C(CN)$_2$.

In a further embodiment this invention provides a malonate corresponding to the formula:

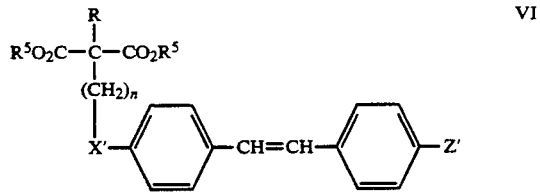

where R, $R^5$, n, X' and Z' are as previously defined for formula V.

The term "transparent" as employed herein refers to a polymeric waveguiding medium which is transparent or light transmitting with respect to incident fundamental and created light frequencies. Under operational conditions such as with a frequency converting waveguide device, the polymeric waveguiding nonlinear optical medium is transparent to both the incident and exit light frequencies.

The term "external field" as employed herein refers to an electric or magnetic field which is applied to a substrate of mobile side chain polymer molecules, to induce dipolar alignment of the polymer side chains parallel to the field.

A present invention optical device can be a laser frequency converter, an optical Kerr effect device, an electrooptical Kerr effect device, a degenerate four wave mixing device, an optical interferometirc waveguide gate, a wide-band electrooptical guided wave analog-to-digital converter, an all-optical multiplexer, an all-optical demultiplexer, an optical bistable device, an optical parametric device, and the like, as elaborated in U.S. Pat. Nos. 4,767,169 and 4,775,215.

An optical interferometric waveguide gate device is described by A. Lattes et al in IEEE J. Quantum Electronics, QE-19(11), 1718 (1983).

A wide-band electrooptical guided-wave analog-to-digital converter device is described by R. A. Becker et al in Proceedings Of The IEEE, 72(7), 802 (1984).

Optical multiplexer-demultiplexer devices are described in U.S. Pat. Nos. 3,532,890; 3,755,676; 4,427,895; 4,455,643; and 4,468,776.

Optical bistable devices are described in U.S. Pat. Nos. 4,515,429 and 4,583,818: and by P. W. Smith et al in Applied Physics Letters, 30(6); 280 (1977) and in IEEE Spectrum, June 1981.

Optical parametric devices are described in U.S. Pat. Nos. 3,371,220; 3,530,301; and 3,537,020.

A present invention optical device can be achieved by constructing one of the optical devices described in the technical literature, except that a present invention polymer medium is utilized as the nonlinear optical component.

The theory of nonlinear harmonic generation by frequency modulation of coherent light with organic optical media is elaborated by A. F. Garito et al in Chapter 1, "Molecular Optics: Nonlinear Optical Properties Of Organic And Polymeric Crystals"; ACS Symposium Series 233 (1983).

Synthesis Procedures

A. Malonic esters

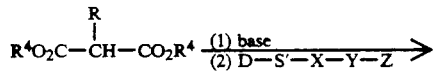

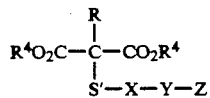

B. Polymalonamides

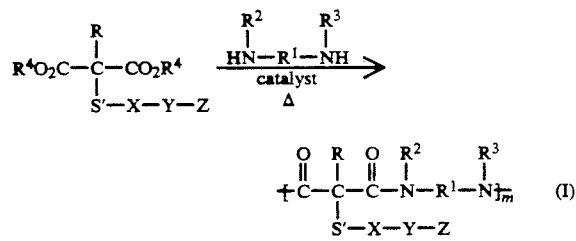

General synthesis procedures for the production of side chain liquid crystalline condensation polymers are described in U.S. Pat. Nos. 4,795,664 and 4,851,502.

A preferred present invention polymalonamide is one which forms an amorphous polymeric optical medium. Amorphous optical media have superior optical properties as compared to liquid crystalline optical media. A present invention amorphous optical medium exhibits exceptional optical transparency, while a liquid crystalline optical medium exhibits a light scattering effect because of deviation from ideal crystalline order. The efficiency of light transmission in a polymeric optical waveguide medium is diminished by light scattering, e.g., when more than about 10 percent of the light wave energy is lost when being transmitted through the optical waveguide.

The term "amorphous" as employed herein refers to a transparent polymeric optical medium which does not have a preferred short range molecular order that exhibits optical anisotropy.

The following examples are further illustrative of the present invention. The components and specific ingredients are presented as being typical, and various modifications can be derived in view of the foregoing disclosure within the scope of the invention.

EXAMPLE I

This Example illustrates the preparation of a polymalonamide in accordance with the present invention.

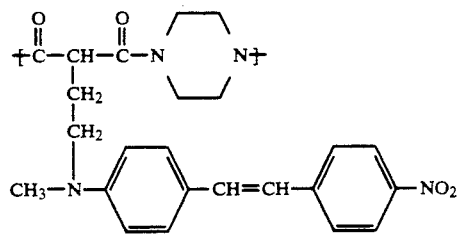

To a stirred solution of 0.5 mol of 4-[N-2-hydroxyethyl-N-methylamino]benzaldehyde in methylene chloride at 0° C. are added 0.51 mol of p-toluenesulfonyl chloride, 0.51 mol of triethylamine, and 0.005 mol of N,N-dimethylaminopyridine, and the reaction medium is warmed slowly to room temperature. After standing at room temperature for one hour, the reaction product medium is washed with cold 1N HCL, saturated sodium bicarbonate solution, and water. The organic solution is separated and dried over molecular sieves, filtered through cotton, and evaporated to yield the 4-[N-2-tosylethyl-N-methylamino]-benzaldehyde as a crystalline product, which then is recrystallized from ethanol.

To 80 mL of absolute ethanol is added 0.3 mol of sodium metal with stirring. After 15 minutes, 0.5 mol of dimethyl malonate is added to the basic solution, and the mixture is stirred for 30 minutes at room temperature. Finally, 0.25 mol of 4-[N-2-tosylethyl-N-methylamino]benzaldehyde is added to the reaction medium which is at reflux temperature. After a reaction period of two hours, the reaction product medium is concentrated to dryness, and the residue is partitioned between water and methylene chloride. The layers are separated, and the organic portion is washed with water, dried over molecular sieves, and concentrated in vacuo. The substituted malonate is purified by column chromatography (silica gel, ethyl acetate:hexane).

A stirred solution of 0.15 mol of the prepared malonate, 0.15 mol of aniline, and 0.0015 mol of toluenesulfonic acid in toluene is heated at reflux with the azeotropic removal of water for 16 hours. Upon cooling of the solution, the crystalline imine precipitate is recovered via filtration and washed with toluene. The product then is dissolved in glacial acetic acid, and 0.15 mol of 4-nitrophenylacetic acid is added to the reaction medium, and the reaction medium is stirred for 1 day at room temperature and for 3 days at 70° C. Upon cooling, the solution is poured into water, and the solid stilbene malonate is collected by vacuum filtration, and recrystallized from ethyl acetate.

A reaction tube is charged with 0.1 mol of the stilbene malonate and 0.1 mol of piperazine, and the monomers are heated at 170° C. with stirring under nitrogen atmosphere. After two hours, a vacuum of 15 mm is applied, and the temperature is raised to 200° C. After an additional 2 hours, the vacuum is lowered to 0.1 mm, and the polymerization is completed at 220° C. After cooling to room temperature, the polymer precipitate is recovered and dissolved in trichloropropane, and precipitated into methanol.

EXAMPLE II

This Example illustrates the preparation of a polymalonamide in accordance with the present invention.

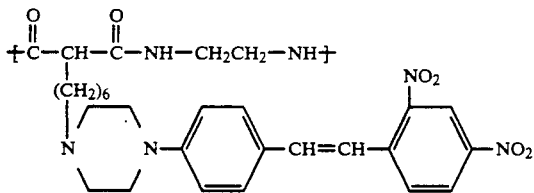

To a solution of 1 mol of 1-phenylpiperazine in methanol are added 2.5 mol each of 6-bromo-1-hexanol, sodium iodide, and potassium carbonate, and the reaction is heated at reflux with stirring for 48 hours. Upon cooling, the product solution is poured into water, and the aqueous medium is extracted with methylene chloride. The combined extracts are washed with portions of water, dried over molecular sieves, and concentrated in vacuo. The excess halohexanol is removed by vacuum distillation, and the crude 1-phenyl-4-(6-hydroxyhexyl)-piperazine product is purified by preparative HPLC (ethyl acetate:hexane).

To a stirred solution of 0.74 mol 1-phenyl-4-(6-hydroxyhexyl)piperazine in methylene chloride at 0° C. are added 0.81 mol of p-toluenesulfonyl chloride, 0.81 mol of triethylamine, and 0.007 mol of 4-N,N-dimethylaminopyridine. The reaction medium is warmed slowly to room temperature. Upon completion of the reaction, the product solution then is washed with cold 1N HCl, saturated sodium bicarbonate solution, and water. The organic portion is dried over molecular sieves and concentrated, and the recovered product is recrystallized from ethanol.

To 100 mL of absolute ethanol is added 0.6 mol of sodium metal with stirring. After 15 minutes, 0.85 mol of dimethyl malonate is added to the basic solution, and the reaction medium is stirred for 30 minutes at room temperature. A 0.5 mol quantity of 1-phenyl-4-(6-tosylhexyl)piperazine is added, and the reaction medium is heated at reflux for two hours. The product medium then is concentrated to dryness, and the residue is partitioned between water and methylene chloride. The layers are separated, and the organic portion is washed with water, dried over molecular sieves, and concentrated in vacuo. The substituted malonate product is purified by column chromatography (silica gel, ethyl acetate:hexane).

To 1.2 mol of dry dimethylformamide is added 0.3 mol of phosphorus oxychloride dropwise with stirring. After 1 hour at 0° C., 0.3 mol of the prepared malonate piperazine intermediate is dissolved in a minimal amount of dimethylformamide and added dropwise to the cooled reaction medium. The reaction medium is heated at 100° C. for 16 hours, then cooled and poured into a saturated solution of aqueous sodium acetate. The aqueous mixture is extracted with diethyl ether, and the combined extracts are dried over molecular sieves, concentrated, and the recovered product aldehyde is purified by HPLC (ethyl acetate:hexane).

A stirred solution of 0.10 mol of the prepared malonate, 0.10 mol of aniline, and 0.001 mol of toluenesulfonic acid in toluene is heated at reflux for 16 hours with the azeotropic removal of water. Upon cooling of the solution, the crystalline imine is recovered and washed with toluene. The product then is redissolved in toluene, and 0.10 mol of 2,4-dinitrophenylacetic acid and 0.2 mol of methacrylic acid are added, and the reaction medium is stirred for 24 hours at room temperature, for 1 hour at 75° C., and for 2 hours at reflux. Upon cooling, the stilbene malonate precipitate is collected by vacuum filtration, and recrystallized from acetonitrile.

A reaction tube is charged with 0.025 mol of the stilbene malonate and 0.025 mol of ethylenediamine, and the monomers are heated at 120° C. with stirring under a nitrogen atmosphere. After two hours, the temperature is raised to 170° C. After an additional 2 hours, a vacuum of 15 mm is applied and the reaction temperature is raised to 200° C. After 2 hours the vacuum is lowered to 0.1 mm, and the polymerization is completed at 220° C. After cooling to room temperature, the polymer precipitate is recovered and dissolved in trichloropropane and precipitated into methanol.

EXAMPLE III

This Example illustrates the preparation of a polymalonamide in accordance with the present invention.

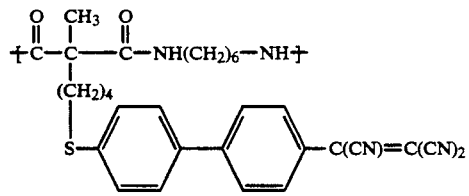

To a solution of 0.5 mol of 4-bromobenzaldehyde in absolute ethanol is added 0.5 mol of malononitrile and one drop of piperidine, and the reaction medium is stirred at reflux for one hour. After cooling to room temperature, the reaction medium is concentrated in vacuo, and the dicyanovinyl product is dissolved in 1500 mL of dry dimethylformamide. The solution is cooled to 0° C., and 0.52 mol of sodium cyanide is added over a 2 minute period with stirring. When TLC indicates that addition of the sodium cyanide is completed, 0.5 mol of lead oxide is added with stirring following by 2000 mL of glacial acetic acid. The reaction medium is warmed to room temperature, and the solution is purged with nitrogen to remove HCN byproduct. After the HCN level in the solution is negligible, the reaction medium is divided into two equal portions, and each portion is poured into 5000 ml of water. The solids that precipitate from solution are collected by filtration. The recovered 4-bromotricyanovinylbenzene product is redissolved in acetone, precipitated into water, and collected by filtration.

To a stirred solution of 0.5 mol of 4-bromothiophenol in methanol are added 1.5 mol each of sodium iodide, potassium carbonate, and 4-bromo-1-butanol, and the reaction medium is heated at reflux for 48 hours. After cooling to room temperature, the product medium is poured into water, and the aqueous portion is extracted with methylene chloride. The combined extracts are dried over molecular sieves and concentrated. The excess halobutanol is removed by vacuum distillation, and the 4-hydroxybutyl-4'-bromophenyl-thioether product is purified by HPLC (silica gel columns, ethyl acetate:hexane).

To a stirred solution of 0.35 mol 4-hydroxybutyl-4'-bromophenyl-thioester in methylene chloride at 0° C. are added 0.42 mol of p-toluenesulfonyl chloride, 0.42 mol of triethylamine, and 0.0035 mol of 4-N,N-dimethylaminopyridine. The mixture is warmed slowly to room temperature, and after a two hour reaction period the product medium is washed with cold 1N HCl, saturated sodium bicarbonate solution, and water. The product medium is dried over molecular sieves and concentrated, and the crude product is recovered and recrystallized from ethanol.

To 33 mL of absolute ethanol is added 0.2 mol of sodium metal with stirring. After 15 minutes 0.28 mol of dimethyl malonate is added to the basic solution, and the mixture is stirred for 30 minutes at room temperature. A 0.16 mol quantity of 4-tosylbutyl-4'-bromophenyl-thioether is added, and the reaction medium is heated at reflux for one hour. The product medium is concentrated to dryness, and the residue is partitioned between water and methylene chloride. The layers are separated, and the organic portion is washed with water, dried over molecular sieves, and concentrated in vacuo. The crude substituted malonate product is purified column chromatography (silica gel ethyl acetate:hexane).

A stirred solution of 0.07 mol of 4-bromotricyanovinylbenzene and 0.07 mol of copper powder (suspension in dimethylformamide) in 100 mL of dimethylformamide is heated at reflux, and 0.1 mol of the substituted malonate in dimethylformamide is added dropwise. Upon completion of the reaction as indicated by TLC, the product medium is cooled to room temperature, and the solids are removed by filtration. The remaining solution is poured into a liter of water, and the crude dimethylmalonate precipitate is recovered by filtration and recrystallized from acetone.

A reaction tube is charged with 0.025 mol of the dimethylmalonate and 0.025 mol of 1,6-hexanediamine, and the monomer mixture is heated at 170° C. with stirring under a nitrogen atmosphere. After two hours, a vacuum of 15 mm is applied and the temperature is raised to 200° C. After 2 hours the vacuum is lowered to 0.1 mm, and the polymerization is completed at 220° C. After cooling to room temperature, the polymer precipitate is recovered and dissolved in trichloropropane, and precipitated into methanol.

EXAMPLE IV

This Example illustrates the construction and operation of an optical frequency converting waveguide module in accordance with the present invention.

A silicon dioxide-coated silicon wafer with a grating electrode is constructed by means of the following fabrication procedures.

A commercially available silicon dioxide-coated silicon wafer is placed in a Varian electron beam vacuum deposition system. A 0.1 μm layer of 99.999% purity aluminum is deposited on the wafer.

AZ-1518 positive photoresist (Hoechst) is spin-coated on the aluminum-coated wafer with a Solitec model 5100 coater. A 1.5 μm photoresist coating is achieved by spinning at 5000 rpm for 30 seconds. The photoresist coating is dried in a vacuum oven at 90° C. for 30 minutes.

The photoresist coating is patterned by placing the wafer in contact with a mask of the desired configuration in a Karl Suss model MJB3 mask aligner, and exposing the masked coating to 405 μm radiation (70 mJ/cm$^2$).

The mask is removed, and a thin piece of silicon (1 cm×2 cm) is placed on the surface of the patterned photoresist as a protective shield, and the combination is exposed to 70 mJ/cm$^2$ of 405 μm radiation. The patterned photoresist is developed with AZ Developer in water (1:1) over a period of 60 seconds, and the developing cycle is terminated by washing with deionized water.

The photoresist-coating of the wafer is baked in a vacuum oven at 120° C. for 45 minutes. The exposed aluminum pattern is etched with type A etchant (Transene Corp.) at 50° C. for 20 seconds, and the etched surface is rinsed with deionized water.

The aluminum grating electrode surface of the wafer then is covered with a 1.5 μm cladding layer of 20% polyvinyl alcohol (75% hydrolyzed) in water by spin-coating at 5000 rpm for 30 seconds, and the cladding layer is dried in a vacuum oven at 110° C. for two hours.

A nonlinear optically active organic layer of 1.65 μm thickness is spin-coated on the cladding layer at 3000 rpm. The spin-coating medium is a 20% solution of the Example I polymalonamide in trichloropropane. The organic layer is dried in a vacuum oven at 160° C. for one hour.

An upper cladding layer of 1.5 μm thickness is added by spin-coating a medium of polysiloxane (GR-651-L, Owens-Illinois Inc., 25% solids in 1-butanol) at 3500 rpm for 30 seconds. The cladding layer is dried in a vacuum oven at 110° C. for 35 minutes. A 0.055 μm coating of aluminum is deposited as an electrode layer on the upper cladding layer.

The fabricated waveguide is placed in a Mettler hot stage, and the unit is raised to 90° C. at 1° C./min. A DC field of 70 V/μm is applied across the waveguiding organic layer for ten minutes by means of the electrodes. The electric field is maintained while the waveguide sample is cooled to room temperature at 1° C./min. The $\chi^{(2)}$ nonlinear optical response of the waveguiding medium is $2 \times 10^{-8}$ a esu as measured at 1.34 μm excitation wavelength.

The waveguide structure is cleaved at opposite ends to provide two sharp faces to couple light in and out of the waveguiding organic layer.

Cylindrical lenses are employed to focus and couple 1.34 radiation (0.01 mJ, 10 nsec wide pulse) into the waveguide. The waveguide is situated on a rotation stage, and phase-matched second harmonic generation is observed when the waveguide is rotated until the periodicity satisfies the value for phase-matching. Under the described operating conditions, about 1% of the fundamental beam is converted into an observed second harmonic radiation.

What is claimed is:

1. A polymer comprising recurring monomeric units corresponding to the formula:

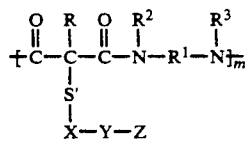

where m is an integer of at least 10; R is hydrogen or a $C_1$-$C_4$ alkyl substituent; $R^1$ is a divalent organic radical containing between about 2-12 carbon atoms; $R^2$ and $R^3$ individually are hydrogen or a $C_1$-$C_4$ alkyl substituent, or taken together with the connecting nitrogen atoms form an alicyclic structure; S' is a spacer group having a linear chain length of about 1-10 carbon atoms; X is an electron-donating group; Y is a 4,4'-diphenylene or 4,4'-stilbene structure; and Z is an electron-withdrawing group.

2. A polymer comprising recurring monomeric units corresponding to the formula:

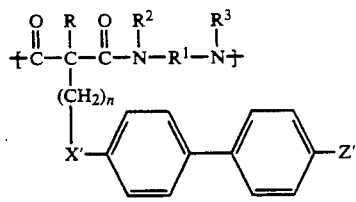

where n is an integer between about 1-10; R is hydrogen or a $C_1$-$C_4$ alkyl substituent; $R^1$ is a divalent organic radical containing between about 2-12 carbon atoms; $R^2$ and $R^3$ individually are hydrogen or a $C_1$-$C_4$ alkyl substituent, or taken together with the connecting nitrogen atoms form an alicyclic structure; X' is —NR—, —O— or —S—; and Z' is —CN, —NO$_2$, —CF$_3$, —CH=C(CN)$_2$ or —C(CN)=C(CN)$_2$; and where the polymer has a glass transition temperature between about 40°-150° C.

3. A polymer in accordance with claim 2 which has a weight average molecular weight in the range between about 10,000-500,000.

4. A polymer comprising recurring monomeric units corresponding to the formula:

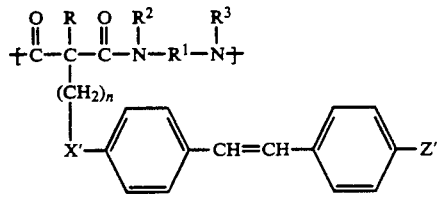

where n is an integer between about 1-10; R is hydrogen or a $C_1$-$C_4$ alkyl substituent; $R^1$ is a divalent organic radical containing between about 2-12 carbon atoms; $R^2$ and $R^3$ individually are hydrogen or a $C_1$-$C_4$ alkyl substituent, or taken together with the connecting nitrogen atoms form an alicyclic structure; X' is —NR—, —O— or —S—; and Z' is —CN, —NO$_2$, —CF$_3$, —CH=C(CN)$_2$ or —C(CN)=C(CN)$_2$; and where the polymer has a glass transition temperature between about 40°-150° C.

5. A polymer in accordance with claim 4 which as a weight average molecular weight in the range between about 10,000-500,000.

6. A nonlinear optical medium consisting of a transparent film of a polymer comprising recurring monomeric units corresponding to the formula:

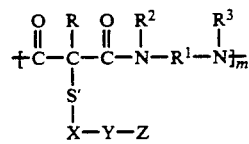

where m is an integer of at least 10; R is hydrogen or a $C_1$-$C_4$ alkyl substituent; $R^1$ is a divalent organic radical containing between about 2-12 carbon atoms; $R^2$ and $R^3$ individually are hydrogen or a $C_1$-$C_4$ alkyl substituent, or taken together with the connecting nitrogen atoms form an alicyclic structure; S' is a spacer group having a linear chain length of about 1-10 carbon atoms; X is an electron-donating group; Y is a 4,4'-diphenylene or 4,4'-stilbene structure; and Z is an electron-withdrawing group.

7. A nonlinear optical medium consisting of a transparent film of a polymer comprising recurring monomeric units corresponding to the formula:

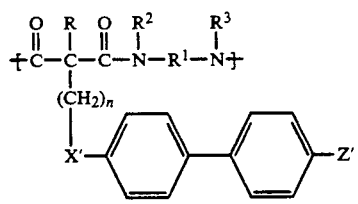

where n is an integer between about 1-10; R is hydrogen or a $C_1$-$C_4$ alkyl substituent; $R^1$ is a divalent organic radical containing between about 2-12 carbon atoms; $R^2$ and $R^3$ individually are hydrogen or a $C_1$-$C_4$ alkyl substituent, or taken together with the connecting nitrogen atoms form an alicyclic structure; X' is —NR—, —O— or —S—; and Z' is —CN, —NO$_2$, —CR$_3$, —CH=C(CN)$_2$ or —C(CN)=C(CN)$_2$; and where the polymer has a glass transition temperature between about 40°-150° C.

8. A nonlinear optical medium consisting of a transparent film of a polymer comprising recurring monomeric units corresponding to the formula:

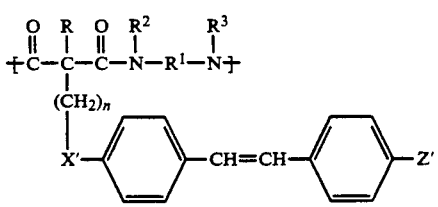

where n is an integer between about 1-10; R is hydrogen or a $C_1$-$C_4$ alkyl substituent; $R^1$ is a divalent organic radical containing between about 2-12 carbon atoms; $R^2$ and $R^3$ individually are hydrogen or a $C_1$-$C_4$ alkyl substituent, or taken together with the connecting nitrogen atoms form an alicyclic structure; X' is —NR—, —O— or —S—; and Z' is —CN, —NO$_2$, —CF$_3$, —CH=C(CN)$_2$ or —C(CN)=C(CN)$_2$; and where the polymer has a glass transition temperature between about 40°–150° C.

* * * * *